United States Patent
Seo et al.

(10) Patent No.: US 9,927,098 B2
(45) Date of Patent: Mar. 27, 2018

(54) DISPLAY DEVICE AND LIGHT EMITTING DEVICE

(71) Applicant: LG INNOTEK CO., LTD., Seoul (KR)

(72) Inventors: Eun Sung Seo, Seoul (KR); Gi Seok Lee, Seoul (KR); Chang Hyuck Lee, Seoul (KR); Hyun Ho Choi, Seoul (KR); Lee Im Kang, Seoul (KR); Ki Cheol Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 161 days.

(21) Appl. No.: 14/415,380

(22) PCT Filed: Apr. 18, 2013

(86) PCT No.: PCT/KR2013/003287
§ 371 (c)(1),
(2) Date: Jan. 16, 2015

(87) PCT Pub. No.: WO2014/014186
PCT Pub. Date: Jan. 23, 2014

(65) Prior Publication Data
US 2015/0192275 A1    Jul. 9, 2015

(30) Foreign Application Priority Data

Jul. 18, 2012 (KR) .......... 10-2012-0078241

(51) Int. Cl.
*G09F 13/04* (2006.01)
*F21V 13/04* (2006.01)
(Continued)

(52) U.S. Cl.
CPC ........... *F21V 13/04* (2013.01); *F21K 9/60* (2016.08); *F21V 5/00* (2013.01); *G02B 19/0028* (2013.01);
(Continued)

(58) Field of Classification Search
CPC ............. G02F 2001/133607; F21V 13/04
(Continued)

(56) References Cited

U.S. PATENT DOCUMENTS

2002/0163808 A1* 11/2002 West .............. F21V 5/04
362/255
2005/0001537 A1 1/2005 West et al. ............ 313/500
(Continued)

FOREIGN PATENT DOCUMENTS

JP 2005-044661 A 2/2005
JP 2006-049324 A 2/2006
(Continued)

OTHER PUBLICATIONS

International Search Report dated Aug. 14, 2013 issued in Application No. PCT/KR2013/003287.
(Continued)

*Primary Examiner* — Anh Mai
*Assistant Examiner* — Matthew Peerce
(74) *Attorney, Agent, or Firm* — Ked & Associates, LLP

(57) ABSTRACT

Disclosed is a display device. The display device includes light sources to generate light; light flux control members to refract the light; a drive substrate on which the light sources are mounted; a cover to cover the drive substrate; reflective portions disposed in at least one of the drive substrate and the cover to reflect the refracted light; and a display panel into which the reflected light is incident.

13 Claims, 9 Drawing Sheets

(51) Int. Cl.
  *G02F 1/1335* (2006.01)
  *G02B 19/00* (2006.01)
  *F21V 5/00* (2018.01)
  *F21K 9/60* (2016.01)
  *F21Y 115/10* (2016.01)

(52) U.S. Cl.
  CPC .. *G02F 1/133603* (2013.01); *G02F 1/133605* (2013.01); *F21Y 2115/10* (2016.08); *G02F 1/133611* (2013.01); *G02F 2001/133607* (2013.01)

(58) Field of Classification Search
  USPC ........................................................ 362/97.1
  See application file for complete search history.

(56) References Cited

U.S. PATENT DOCUMENTS

| | | | |
|---|---|---|---|
| 2006/0028842 A1 | 2/2006 | Kim et al. | 362/612 |
| 2006/0065900 A1 | 3/2006 | Hsieh et al. | 257/79 |
| 2006/0067079 A1 | 3/2006 | Noh et al. | |
| 2006/0152932 A1* | 7/2006 | Wu | F21V 5/04 362/327 |
| 2007/0024990 A1 | 2/2007 | Paek et al. | 359/725 |
| 2007/0183136 A1 | 8/2007 | Park et al. | |
| 2007/0201225 A1* | 8/2007 | Holder | F21K 9/00 362/227 |
| 2008/0037279 A1 | 2/2008 | Chen | |
| 2008/0192479 A1 | 8/2008 | Wanninger | |
| 2008/0266875 A1 | 10/2008 | Chang et al. | |
| 2008/0297918 A1 | 12/2008 | Park et al. | |
| 2012/0099050 A1* | 4/2012 | Kasai | G02F 1/133603 349/64 |
| 2012/0287375 A1 | 11/2012 | Matsuki et al. | |
| 2013/0013252 A1* | 1/2013 | Ono | G01B 11/24 702/167 |

FOREIGN PATENT DOCUMENTS

| | | |
|---|---|---|
| JP | 2012-113312 A | 6/2012 |
| KR | 10-2007-0008217 A | 1/2007 |
| KR | 10-2007-0013469 A | 1/2007 |
| KR | 10-2010-0007093 A | 1/2010 |
| WO | WO 2011/096192 A1 | 8/2011 |

OTHER PUBLICATIONS

Korean Office Action dated Feb. 25, 2014 issued in Application No. 10-2012-0078241.
European Search Report dated Jun. 16, 2015 issued in Application No. 13820228.8.
European Office Action dated Dec. 14, 2016 issued in Application No. 13820228.8.
Chinese Office Action dated Jul. 13, 2017 issued in Application No. 201380038385.4 (English translation attached).

* cited by examiner

[Figure 1]
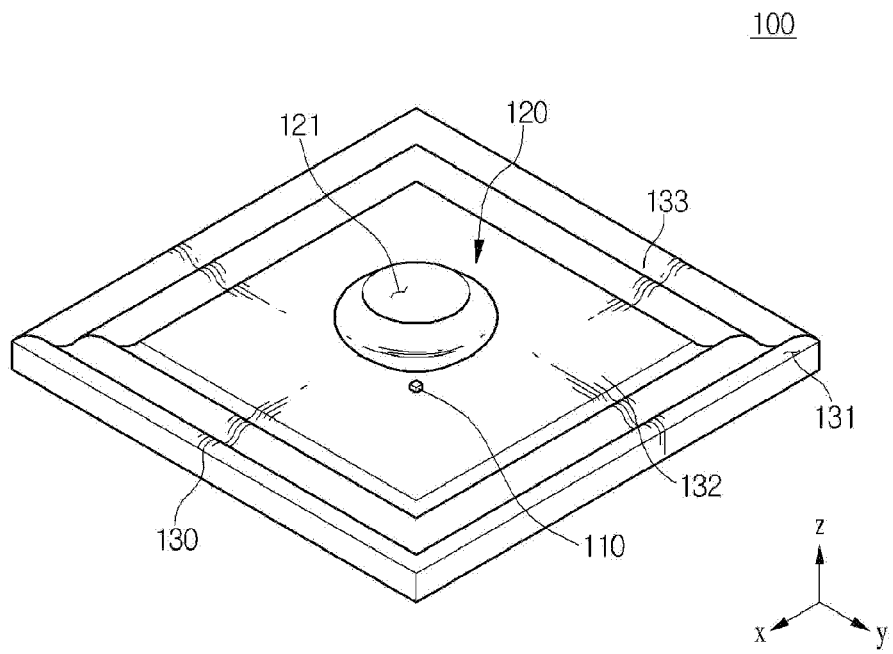
[Figure 2]
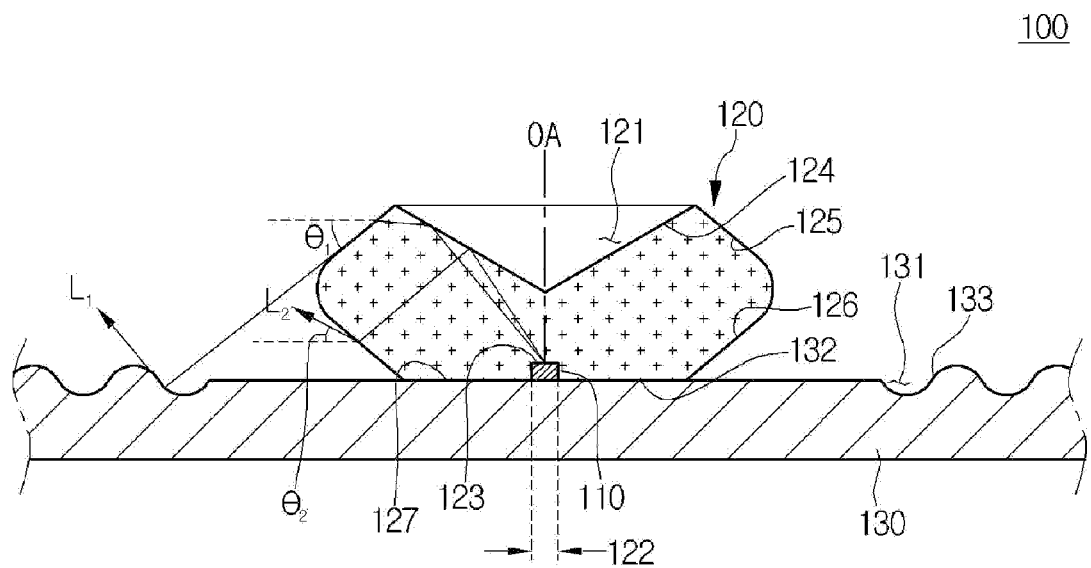

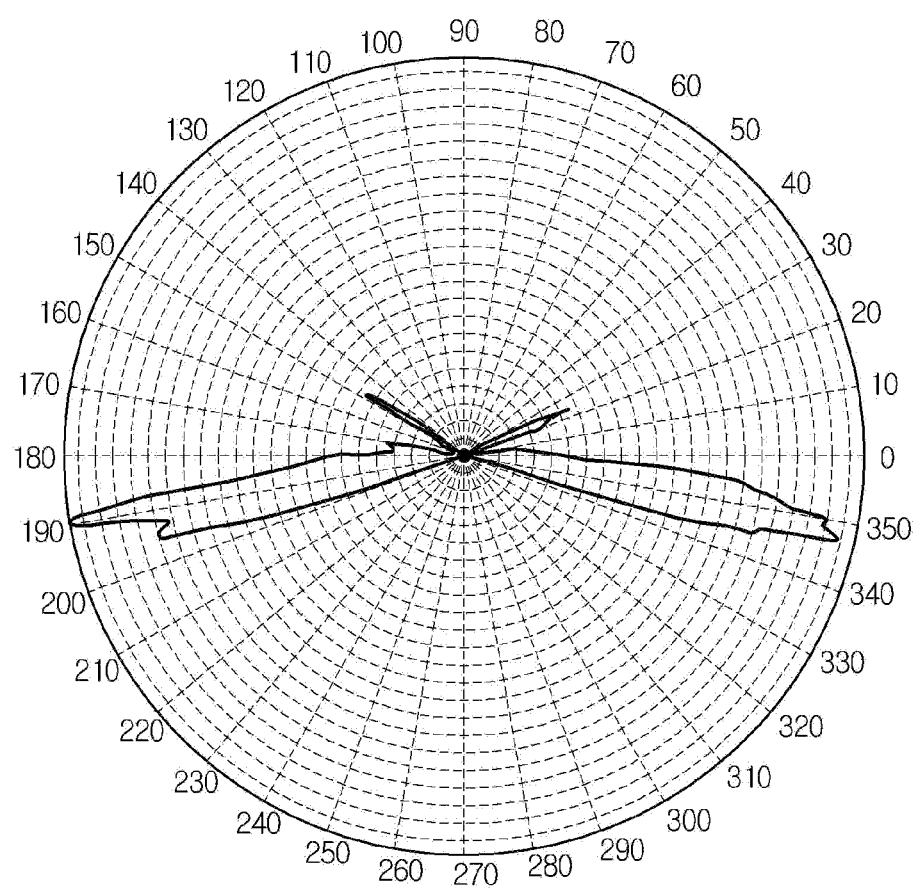
[Figure 3]

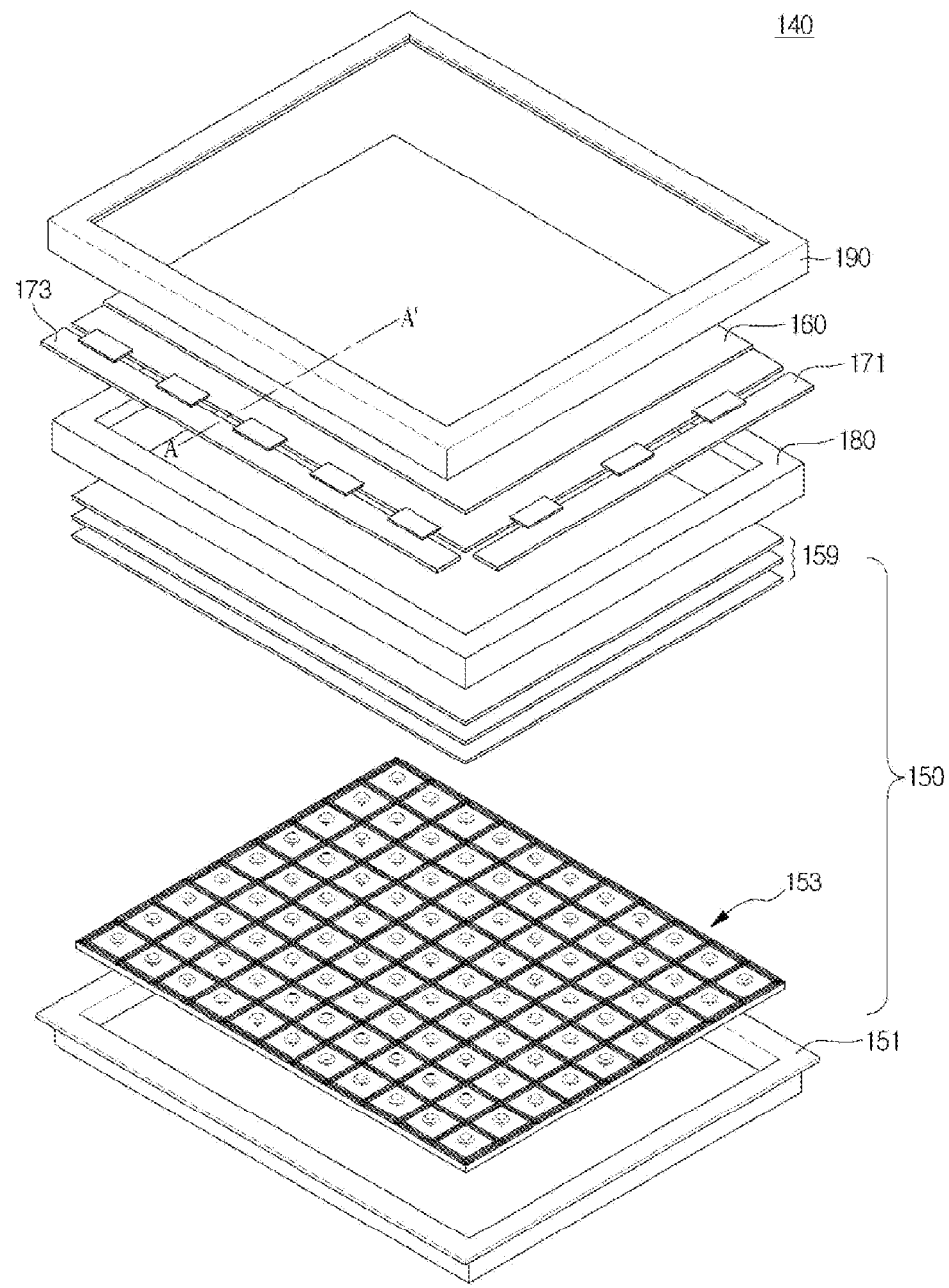
[Figure 4]

[Figure 5]
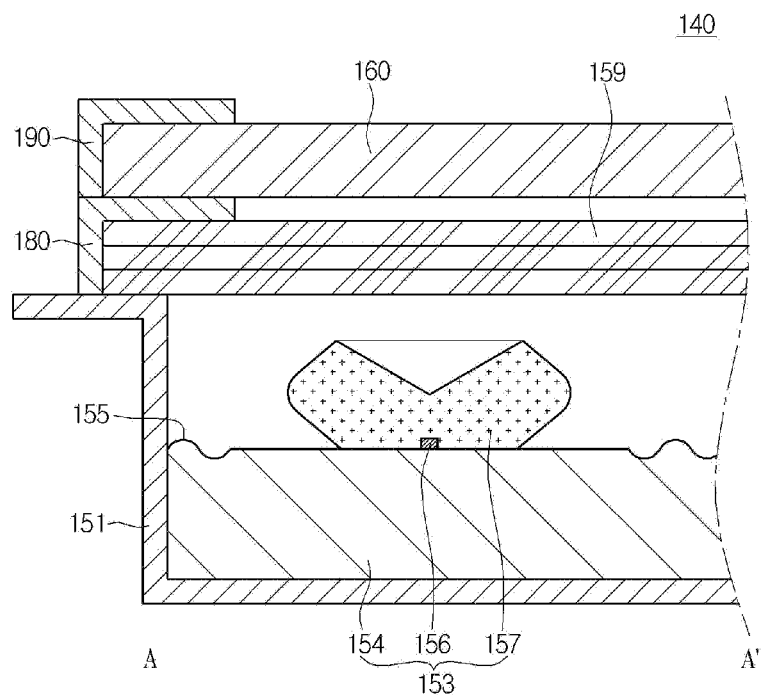
[Figure 6]
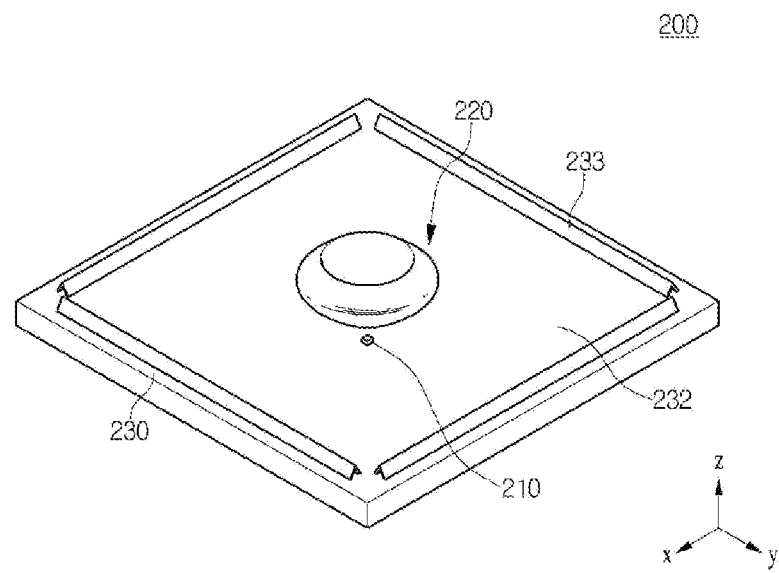

【Figure 7】
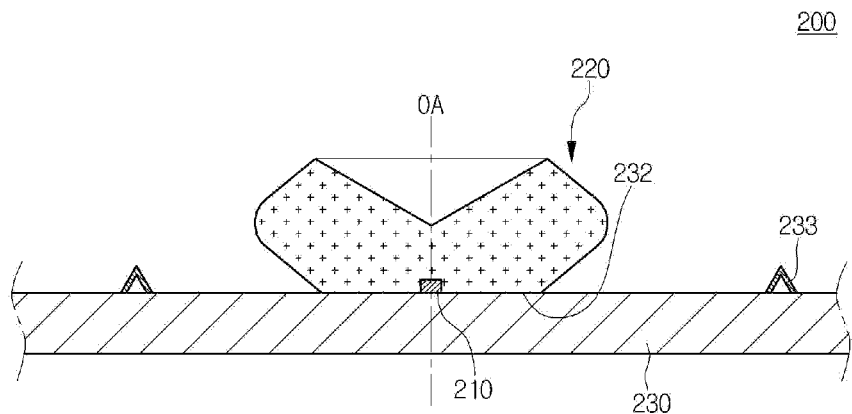
【Figure 8】
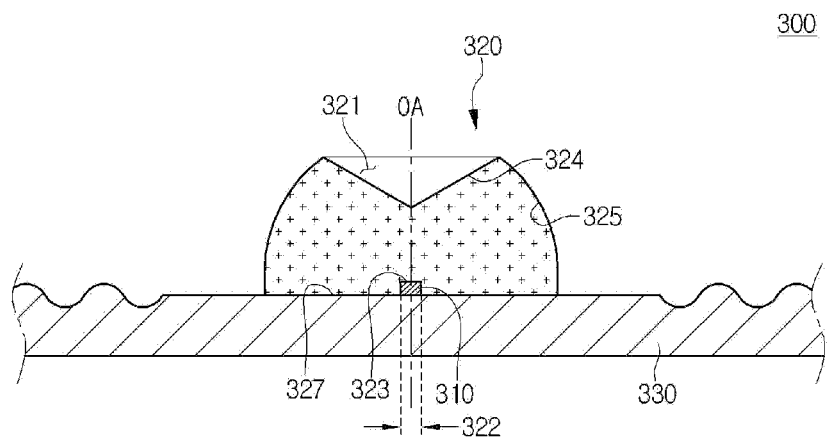
【Figure 9】
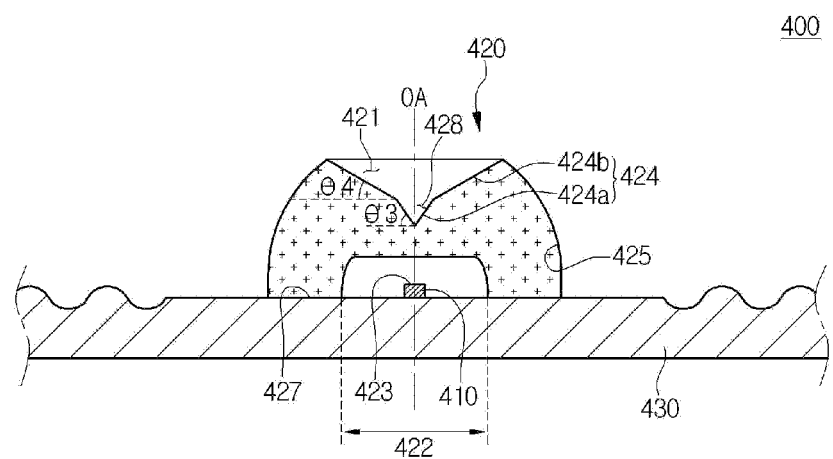

[Figure 10]
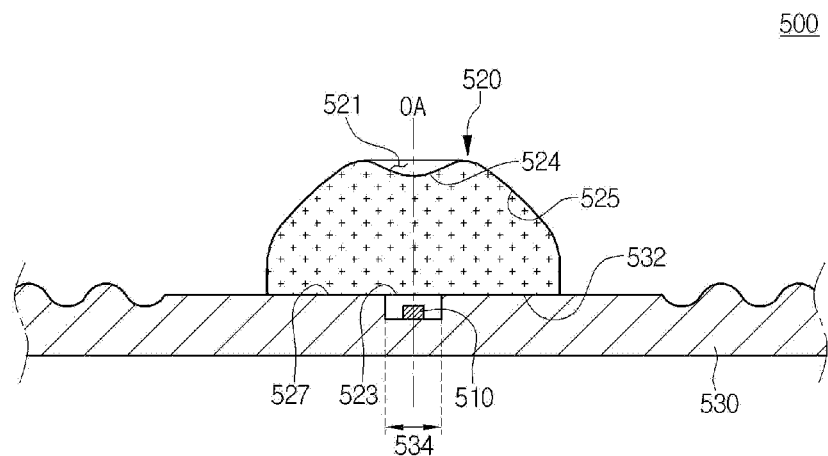
[Figure 11]
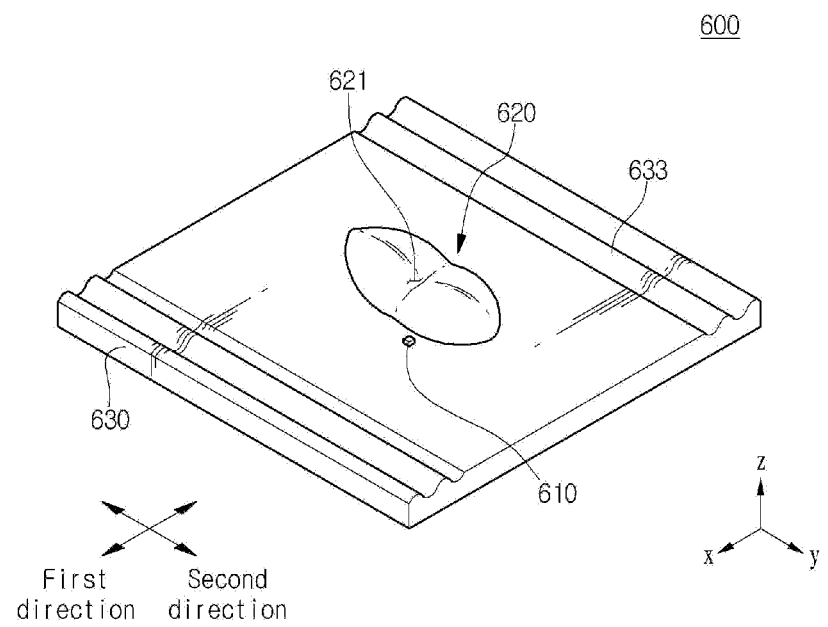

[Figure 12]
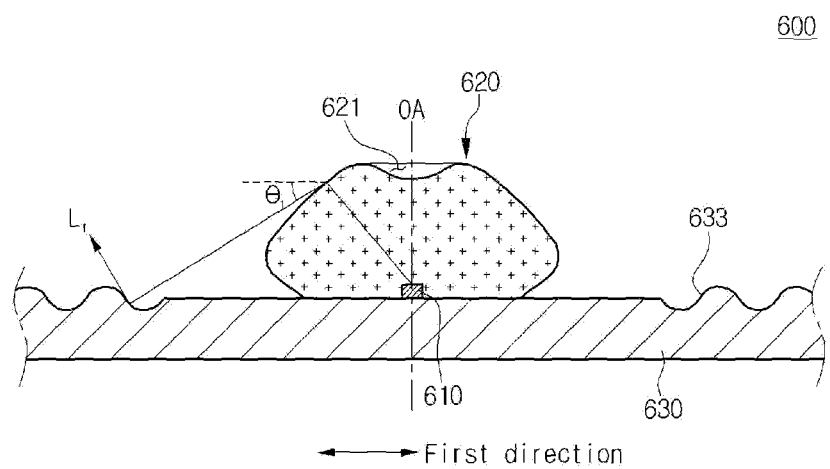
← First direction →
[Figure 13]
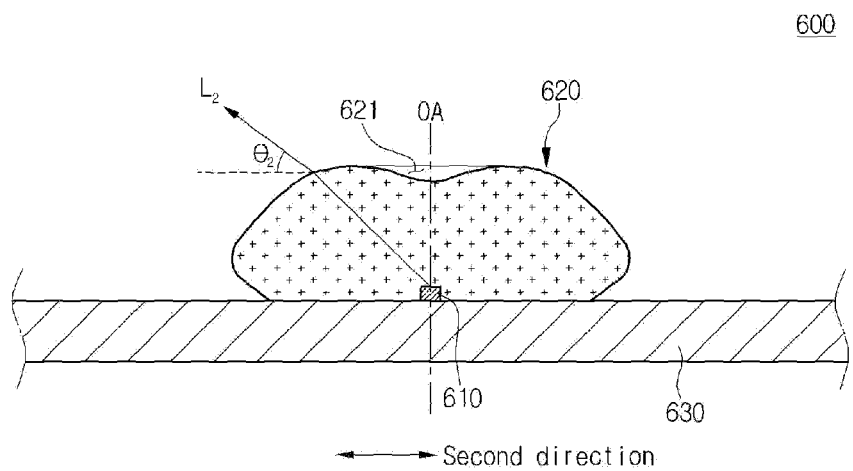
← Second direction →

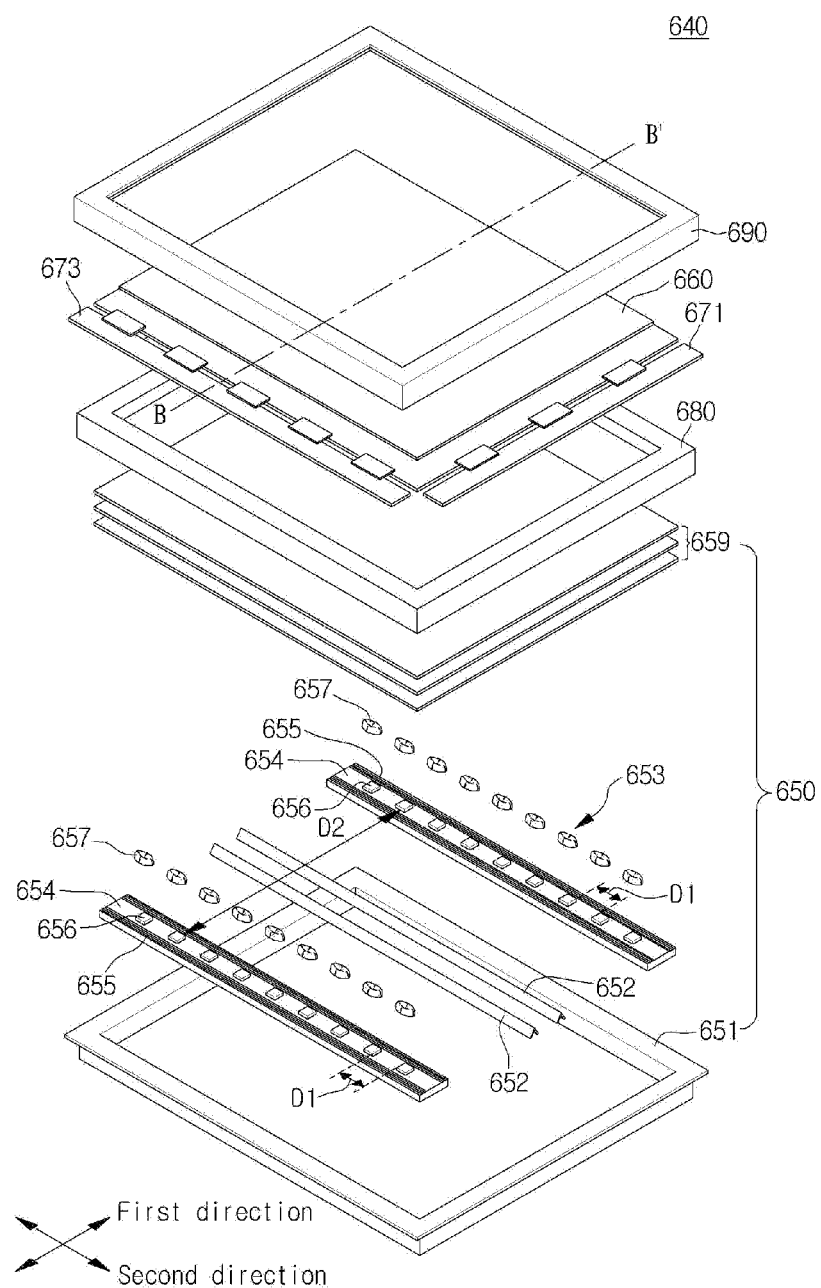
[Figure 14]

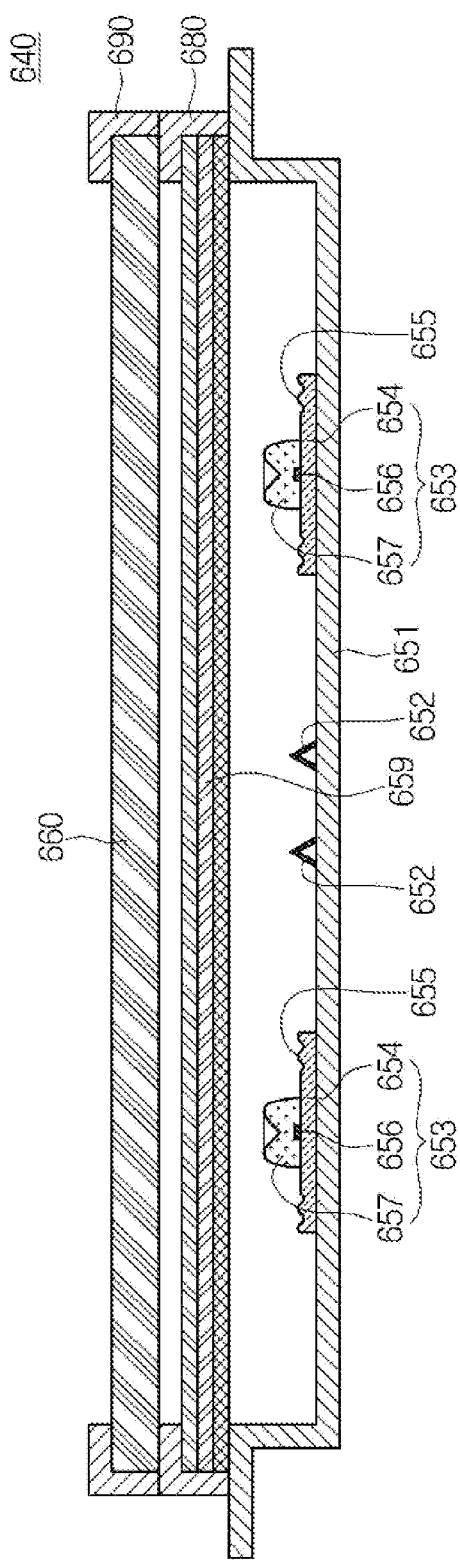

DISPLAY DEVICE AND LIGHT EMITTING DEVICE

CROSS-REFERENCE TO RELATED PATENT APPLICATIONS

This application is a U.S National Stage Application under 35 U.S.C. § 371 of PCT Application No. PCT/KR2013/003287, filed Apr. 18, 2013, which claims priority to Korean Patent Application No. 10-2012-0078241, filed Jul. 18, 2012, whose entire disclosures are hereby incorporated by reference.

TECHNICAL FIELD

Embodiments relate to a display device and a light emitting device.

BACKGROUND ART

In general, an LCD (Liquid Crystal Display) has been extensively used because it can be made lightweight and thin and its consumption power can be reduced. The LCD displays an image by using properties of liquid crystal that the alignment of molecules is changed according to the voltage or temperature. The LCD includes a BLU (Back Light Unit) and an LCD panel. The BLU is installed on a back surface of the LCD panel to irradiate light to the LCD panel. The LCD panel displays a picture by using the light incident from the BLU.

The BLU includes a light source for generating light and is classified into a direct type BLU and an edge type BLU according to the position of a light source. In the edge type BLU, the light source is placed at a side the BLU, and the light generated from the light source is guided through a light guide plate such that the light irradiates to the LCD panel. In the direct type BLU, the light source is located corresponding to the back surface of the LCD panel, such that the light generated from the light source irradiates directly to the LCD panel.

However, the BLU described above has a problem in that light irradiates non-uniformly to the LCD panel. For this reason, a performance of an LCD may deteriorate. Thus, in order to solve the problem, a distance between the direct type BLU and the LCD panel must be ensured. As the distance between the direct type BLU and the LCD panel becomes widened, the performance of the LCD may be more improved.

However, the thickness of the LCD may become large proportionally to the distance between the BLU and the LCD panel. That is, it is difficult to make the LCD small. Thus, there is a need to provide a method for ensuring brightness uniformity while making the LCD in a small size.

DISCLOSURE

Technical Problem

Embodiments provide a display device capable of ensuring brightness uniformity with a small size.

Technical Solution

According to the embodiment, there is provided a display device including light sources to generate light; light flux control members to refract the light; a drive substrate on which the light sources are mounted; a cover to cover the drive substrate; reflective portions disposed in at least one of the drive substrate and the cover to reflect the refracted light; and a display panel into which the reflected light is incident.

Advantageous Effects

According to the display device and the light emitting device of the embodiment, the reflective portion of the drive substrate reflects the light irradiated through the light flux control member, so that the light generated from the light source may be diffused in a wider range. Thus, even if the number of light sources is not increased in the light emitting device, the light may be effectively irradiated toward the LCD panel. In addition, the light flux control member may output light toward the drive substrate, so that the space between the light emitting device and the LCD panel may be reduced. That is, a thickness of the display device may be reduced. Therefore, brightness uniformity of the display device can be ensured while minimizing the size of the display device.

DESCRIPTION OF DRAWINGS

FIG. 1 is an exploded perspective view showing a light emitting device according to the first embodiment.

FIG. 2 is a sectional view showing one section of the light emitting device according to the first embodiment.

FIG. 3 is a view showing a beam angle of a light flux control member of the light emitting device according to the first embodiment.

FIG. 4 is an exploded perspective view showing a display device according to the first embodiment.

FIG. 5 is a sectional view taken along the line A-A' of FIG. 4.

FIG. 6 is an exploded perspective view showing a light emitting device according to the second embodiment.

FIG. 7 is a sectional view showing the light emitting device according to the second embodiment.

FIG. 8 is a sectional view showing a light emitting device according to the third embodiment.

FIG. 9 is a sectional view showing a light emitting device according to the fourth embodiment.

FIG. 10 is a sectional view showing a light emitting device according to the fifth embodiment.

FIG. 11 is an exploded perspective view showing a light emitting device according to the sixth embodiment.

FIG. 12 is a sectional view showing the light emitting device according to the sixth embodiment based on a first direction.

FIG. 13 is a sectional view showing the light emitting device according to the sixth embodiment based on a second direction.

FIG. 14 is an exploded perspective view showing a display device according to sixth embodiment.

FIG. 15 is sectional view taken along the line B-B' of FIG. 14.

MODE FOR INVENTION

Hereinafter, the embodiments will be described in more detail wither reference to accompanying drawings. In the following description, for the illustrative purpose, the same components will be assigned with the same reference numerals. If it is determined that description about well-known functions or configurations may make the subject matter of the embodiments unclear, the details thereof will be omitted.

In the description of the embodiments, it will be understood that when a panel, a sheet, a member, a guide or a unit is referred to as being "on" or "under" another panel, another sheet, another member, another guide, or another unit, it can be "directly" or "indirectly" on the other panel, sheet, member, guide or unit. Such a position of the elements has been described with reference to the drawings. The size of elements shown in the drawings may be exaggerated for the purpose of convenience or clarity. In addition, the size of elements does not utterly reflect an actual size.

FIG. 1 is an exploded perspective view showing a light emitting device according to the first embodiment. FIG. 2 is a sectional view showing one section of the light emitting device according to the first embodiment. FIG. 3 is a view showing a beam angle of a light flux control member of the light emitting device according to the first embodiment.

Referring to FIGS. 1 and 2, a light emitting device 100 includes a light source 110, a light flux control member 120 and a drive substrate 130.

The light source 110 generates light. The light source 110 is mounted on the drive substrate 130. The light source 110 generates light according to a driving signal received at the drive substrate 130. The light source 110 may control a quantity of light according to a voltage applied from the drive substrate 130.

The light source 110 may be a point light source such as an LED (Light Emitting Diode). The light source 110 may be a surface light source which is formed by arranging a plurality of LEDs. That is, the LEDs may be dispersed and disposed at a predetermined interval. Each of the LEDs means an LED package including a diode chip. The LEDs may radiate white light, or blue, green and red lights, respectively.

The light flux control member 120 controls the light flux of light generated from the light source 110. The light flux control member 120 diffuses the light generated from the light source 110. The light flux control member 120 is mounted on the drive substrate 130. The light flux control member 120 covers the light source 110. The light flux control member 120 may receive a portion or the whole of the light source 110. The light flux control member 120 may individually cover each of the LEDs. The light flux control member 120 has an isotropic structure. An optical axis OA of the light source 110 passes through the center of the light flux control member 120. In addition, the light flux control member 120 is formed of a transparent material. The light flux control member 120 may have a refractive index in the range of about 1.4 to about 1.5. For example, the light flux control member 120 may be formed of plastic or glass.

The light flux control member 120 includes a depressed portion 121 and a groove portion 122 formed therein. The light flux control member 120 includes an incident surface 123, a reflective surface 124, a first refractive surface 125, a second refractive surface 126 and a back surface 127.

The depressed portion 121 is formed at an upper portion of the light flux control member 120. The depressed portion 121 corresponds to the light source 110. The depressed portion 121 is formed concavely toward the light source 110. The depressed portion 121 is formed at the central portion of the light flux control member 120. The center of the depressed portion 121 is aligned with the optical axis OA of the light source 110. That is, the depressed portion 121 has a line-symmetric structure with respect to the optical axis OA of the light source 110.

The groove portion 122 is formed at a lower portion of the light flux control member 120. The groove portion 122 corresponds to the light source 110. The groove portion 122 spaces the depressed portion 121. The groove portion 122 is formed concavely toward the depressed portion 121. The groove portion 122 is formed at the central portion of the light flux control member 120. The center of the groove portion 122 is aligned with the optical axis OA of the light source 110. The groove portion 122 has a line-symmetric structure with respect to the optical axis OA of the light source 110. The groove portion 122 receives a portion or the whole of the light source 110. That is, the light source 110 is disposed in the groove portion 122.

The incident surface 123 is a surface onto which the light generated from the light source 110 is incident. The center of the incident surface 123 is aligned with the optical axis OA of the light source 110. The incident surface 123 is disposed at the groove portion 122. The incident surface 123 is the inner surface of the groove portion 122. The incident surface 123 may adhere to the light source 110. That is, the incident surface 123 may make direct contact with the light source 110. Thus, the light generated from the light source 110 may be incident onto the incident surface 123 without loss between the light source 110 and the incident surface 123.

The reflective surface 124 is a surface which reflects the light incident through the incident surface 123 onto the surface. The reflective surface 124 may total-reflect light. The reflective surface 124 may reflects light in a lateral, lateral upper or lateral lower direction. That is, the reflective surface 124 may reflect light to a first refractive surface 125 or a second refractive surface 126. Thus, the reflective surface 124 may prevent a hot spot in that light excessively concentrates upon the central portion of the light flux control member 120.

The reflective surface 124 faces the incident surface 123. The center of the reflective surface 124 is disposed on the optical axis OA of the light source 110. The reflective surface 124 is disposed at the depressed portion 121. The reflective surface 124 is the inner surface of the depressed portion 121. That is, the reflective surface 124 is extended from the optical axis OA of the light source 110. The reflective surface 124 is extended outward perpendicular to or inclined to the optical axis OA of the light source 110. The distance between the reflective surface 124 and the optical axis OA of the light source 110 may be gradually increased from the light source 110. The reflective surface 124 may surround the optical axis OA of the light source 110. The reflective surface 124 may have a cone shape having the vertex toward the light source 110.

The first refractive surface 125 is a surface from which the light incident from the incident surface 123 or reflected upon the reflective surface 124 is radiated. The first refractive surface 125 refracts light. The first refractive surface 125 may refract light in a lateral, lateral upper or lateral lower direction.

The first refractive surface 125 is extended from the reflective surface 124. The first refractive surface 125 is extended from the reflective surface 124 while being bent or curved. The first refractive surface 125 may be extended from the reflective surface 124 in the lateral lower direction. That is, the first refractive surface 125 may be extended from the reflective surface 124 to approach to the drive substrate 130. The distance between the first refractive surface 125 and the optical axis OA of the light source 110 may be gradually increased from the reflective surface 124. Further, the first refractive surface 125 may be spherical or aspherical. The first refractive surface may surround the optical axis OA of the light source 110. In addition, the first refractive surface 125 may surround the reflective surface 124.

The second refractive surface 126 is a surface, from which the light incident from the incident surface 123 or reflected upon the reflective surface 124, is radiated. The second refractive surface 126 refracts light. The second refractive surface 126 may refract light in a lateral, lateral upper or lateral lower direction.

The second refractive surface 126 is extended from the first refractive surface 125. The second refractive surface 126 is extended from the refractive surface 125 while being bent or curved. The second refractive surface 126 may be extended from the first refractive surface 125 in the lateral lower direction. That is, the second refractive surface 126 may be extended from the refractive surface 125 to approach to the drive substrate 130. The second refractive surface 126 may be extended toward the optical axis OA of the light source 110. In other words, the distance between the second refractive surface 126 and the optical axis OA of the light source 110 may be gradually reduced in a direction away from the first refractive surface 125. Further, the second refractive surface 126 may be spherical or aspherical. The second refractive surface may surround the optical axis OA of the light source 110. In addition, the second refractive surface 126 may surround the incident surface 123.

The back surface 127 connects the incident surface 123 to the second refractive surface 126. The back surface 127 faces the drive substrate 130. The back surface 127 is extended from the incident surface 123 to the refractive surface 126. The back surface 127 is extended in an outer direction perpendicular to the optical axis OA of the light source 110. The back surface 127 may adhere to the drive substrate 130. That is, the back surface 127 may make direct contact with the drive substrate 130.

The drive substrate 130 supports the light source 110 and the light flux control member 120 and controls the driving of the light source 110. That is, the drive substrate 130 is electrically connected to the light source 110. The drive substrate 130 transfers a driving signal to the light source 110. The drive substrate 130 may be a printed circuit board (PCB). For example, the drive substrate 130 may have a plate structure. A plurality of transmission lines (not shown) may be embedded in the drive substrate 130. One ends of the transmission lines may be connected to a driving unit (not shown). In addition, the other ends of the transmission lines are exposed to an outside, such that a connecting terminal (not shown) may be formed. As the light source 110 is attached to the connecting terminal by using paste, the drive substrate 130 may be electrically connected to the light source 110.

Concave portions 131 are formed on the drive substrate 130. The drive substrate 130 includes a mounting surface 132 and reflective portions 133.

The concave portions 131 are formed on the drive substrate 130. The concave portions 131 are concaved toward a lower portion of the drive substrate 130. The sectional shape of the concave portions 131 may be triangular, rectangular or semicircular. The concave portions 131 are extended from edges of the light source 110 and the light flux control member 120. Some of the concave portions 131 are extended in a direction parallel to one axis, and the other concave portions 131 are extended in a direction parallel to the other axis perpendicular to the one axis. That is, the concave portions 131 may cross each other at right angles at the edges of the light source and the light flux control member 120. The concave portions 131 surround the optical axis OA of the light source 110. That is, the concave portions 131 have a line-symmetric structure with respect to the optical axis OA.

The mounting surface 132 is a surface on which the light source 110 is mounted. The mounting surface 132 faces the light source 110 and the light flux control member 120. The center of the mounting surface 132 is disposed on the optical axis OA. The concave portions 131 are formed at the edge of the mounting surface 132. The mounting surface 132 adheres to the light source 110. That is, the mounting surface 132 makes direct contact with the light source 110. Further, the mounting surface 132 may adhere to the light flux control member 120. That is. The mounting surface 132 may make direct contact with the back surface 127 of the light flux control member 120.

The reflective portions 133 reflect light radiated from the light flux control member 120. The reflective portions 133 may total-reflect light. The reflective portions 133 may reflect light in a lateral upper direction.

The reflective portions 133 may include the inner surfaces of the concave portions 131. The reflective portions 133 may be more convex than the mounting surface 132. The sectional shape of the reflective portions 133 may be semicircular. The sectional shape of the reflective portions 133 may be triangular, rectangular or diamond. The reflective portions 133 are extended from the mounting surface 132. The reflective portions 133 are extended from the mounting surface 134 while being bent or curved. That is, the reflective portions 133 extended while forming at least one curve. In other words, each of the reflective portions 133 may include a concave curved surface and a convex curved surface. The reflective portions 133 are extended in an outer direction perpendicular to the optical axis OA of the light source 110. The reflective portions 133 surround the optical axis OA of the light source 110. In addition, the reflective portions 133 surround the mounting surface 132. That is, the reflective portions 133 surround the light flux control member 120.

According to the embodiment, the light generated from the light source 110 is omni-directionally irradiated through the light flux control member 120. As shown in FIG. 3, the light flux control member 120 may radiate light at a beam angle more than 180°. That is, the light flux control member 120 may radiate light in a direction inclined at a negative angle with respect to a horizontal plane perpendicular to the optical axis OA of the light source 110. A portion of the light generated from the light source 110 may be reflected by the reflective portion 133.

For example, after a first light L1 is generated from the light source 110, the first light L1 is radiated from the first refractive surface 125. In this case, the first light L1 is reflected on the reflective surface 124 and refracted on the first refractive surface 125. The first refractive surface 125 refracts the first light L1 in a direction inclined at a negative angle with respect to the horizontal plane perpendicular to the optical axis OA of the light source 110. When the first light L1 is refracted on the first refractive surface 125, a first angle $\theta 1$ between the first light L1 and the horizontal plane is negative. In addition, the first light L1 is reflected at the reflective portion 133.

Meanwhile, after a second light L2 is generated from the light source 110, the second light L2 is radiated from the second refractive surface 126. In this case, the second light L2 is reflected on the reflective surface 124 and refracted on the second refractive surface 126. The second refractive surface 126 refracts the second light L2 in a direction inclined at a positive angle with respect to the horizontal plane. When the second light L2 is refracted on the second refractive surface 126, a second angle $\theta 2$ between the second light L2 and the horizontal plane is positive.

FIG. 4 is an exploded perspective view showing a display device according to the first embodiment, and FIG. 5 is a sectional view taken along the line A-A' of FIG. 4.

Referring to FIGS. 4 and 5, an LCD (Liquid Crystal Display) 140 according to the embodiment includes a BLU (Back Light Unit) 150 and an LCD panel 160, a panel control substrate 171 and 173, a panel guider 180 and an upper case 190.

The BLU 150 performs a function of generating and outputting light. According to the embodiment, the BLU 150 is implemented in a direct type. The BLU 150 includes a lower cover 151, a light emitting device 153 and at least one optical sheet 159.

The lower cover 151 has a shape of a box, a top surface of which is opened. The lower cover 151 receives the light emitting device 153 through an upper portion thereof, and support and protects the light emitting device 153. In addition, the lower cover 151 supports the optical sheet 159 and the LCD panel 160. The lower cover 151 may be made of metal. For example, the lower cover 151 may be formed by allowing a metal plate to be bent or curved. As the metal plate is bent or curved, a space for receiving the light emitting device 153 may be formed in the lower cover 151.

The light emitting device 153 radiates light. The light emitting device 153 includes a drive substrate 154, a plurality of light source 156 and a plurality of light flux control members 157.

The drive substrate 154 supports the light sources 156 and the light flux control members 157. The drive substrate 154 controls the driving operation of the light sources 156. That is, the drive substrate 154 transfers driving signals to the light sources 156. The drive substrate 154 may be configured as described above according to the embodiment. That is, the drive substrate 154 includes reflective portions 155. The reflective portions 155 are spaced apart from each other. The reflective portions 155 reflect light radiated from the light flux control members 157.

The light sources 156 are mounted on the drive substrate 154. The light sources 156 are dispersed and disposed at a predetermined interval. The light sources 156 are disposed between the reflective portions 155. For example, the light sources 156 may be arranged in a grid structure. The light sources 156 are electrically connected to the drive substrate 154. The light sources 156 are driven under control of the drive substrate 154, such that light is generated.

The light flux control members 157 cover the light sources 156, respectively. The light flux control members 157 may be configured as described above according to the embodiment. That is, the light flux control member 157 diffuses the light generated from the light source 156. In this case, the light flux control member 157 may refract light toward the reflective portion 155.

The optical sheet 159 improves an optical property of light incident from the light emitting device 153 and allows the light to pass therethrough. The optical sheet 159 may be a polarization sheet, a prism sheet or diffusion sheet.

The LCD panel 160 displays an image by using the light input from the BLU 150. The LCD panel 160 is mounted on the BLU 150 through the rear thereof.

Although not shown, the LCD panel 160 includes a TFT (Thin Film Transistor) substrate and a C/F (Color Filter) substrate, which face and are bonded to each other to maintain a uniform cell gap, and a liquid crystal layer interposed between the TFT substrate and the C/F substrate. The TFT substrate changes the liquid crystal arrangement. Thus, the TFT substrate varies the light transmittance of the light that passes through the optical sheet. The TFT substrate includes a plurality of gate lines, a plurality of data lines, and thin film transistors which are formed at regions at which the gate lines cross the data lines. The C/F substrate allows the light passing through the liquid crystal layer to have specific colors.

Panel control substrates 171 and 173 are provided form controlling the LCD panel 160. The panel control substrates 171 and 173 include a gate drive substrate 171 and a data drive substrate 173. The panel control substrates 171 and 173 are electrically connected to the LCD panel through COF (Chip On Film). The COF may be substituted with TCP (Tape Carrier Package).

The panel guider 180 supports the LCD panel 160. The panel guider 180 is interposed between the BLU 150 and the LCD panel 160.

The upper case 190 is configured to surround a periphery of the LCD panel 160. The upper case 190 is combined with the panel guider 180.

Meanwhile, although the drive substrate including the reflective portions is disclosed in the above-described embodiment as one example, the embodiment is not limited thereto. That is, even though the drive substrate is configured to be separated from the reflective portions, the embodiment can be implemented. This will be described in detail as follows.

FIG. 6 is an exploded perspective view showing a light emitting device according to the second embodiment. FIG. 7 is a sectional view showing the light emitting device according to the second embodiment.

Referring to FIGS. 6 and 7, the light emitting device 200 according to the second embodiment includes a light source 210, a light flux control member 220 and a drive substrate 230. Since the elements of the second embodiment are similar to those of the above-described embodiment, the detailed description thereof will be omitted.

Only, the light emitting device 200 of the second embodiment further includes reflective portions 233. The reflective portions 233 are mounted on the drive substrate 230. The reflective portions 233 surround the light flux control member 220. The reflective portions 233 protrude more than a mounting surface 232. The sectional shape of the reflective portions 233 may be triangular, rectangular, diamond or semicircular.

Meanwhile, although the light flux control member including the incident surface, the reflective surface, the first and second refractive surfaces and the back surface has been described in the above embodiment as one example, the embodiment is not limited thereto. For example, even if the light flux control member has no second refractive surface, the embodiment can be implemented, which will be described below in detail.

FIG. 8 is a sectional view showing a light emitting device according to the third embodiment.

Referring to FIG. 8, the light emitting device 300 according to the third embodiment includes a light source 310, a light flux control member 320 and a drive substrate 330. The light flux control member 320 includes a depressed portion 321 and a groove portion 322 formed therein. The light flux control member 320 includes an incident surface 323, a reflective surface 324, a first refractive surface 325, and a back surface 327. Since the elements of the light emitting device according to the third embodiment are the same as or similar with the corresponding those of the above-described embodiments, the detailed description will be omitted.

In the light emitting device 300 of the third embodiment, the first refractive surface 325 is extended from the reflective surface 324 and is connected to the back surface 327. The distance between the first refractive surface 325 and the optical axis OA of the light source 310 may be gradually increased from the reflective surface 324. That is, the distance between the first refractive surface 325 and the optical axis OA of the light source 310 may be gradually increased toward the drive substrate 330. The refractive surface 325 may surround the optical axis OA of the light source 310. The reflective surface 325 may surround the reflective surface 324 and the incident surface 323, respectively.

In addition, in the light emitting device 300 of the embodiment, the back surface 327 of the light flux control member 320 is connected to the incident surface 323 and the first refractive surface 325. That is, the back surface faces the drive substrate 330. The back surface 327 is extended from the incident surface 323 to the first refractive surface 325. The back surface 327 is extended in an outer direction perpendicular to the light axis OA of the light source 310.

Meanwhile, although the light flux control member including the depressed portion formed therein is disclosed in the third embodiment as one example, the embodiment is not limited thereto. That is, since the depressed portion having various shapes may be formed, the embodiment can be implemented. In addition, although the incident surface of the light flux control member which adheres to the light source is disclosed as one example in the above described embodiments, the embodiments are not limited thereto. That is, even though the incident surface of the light flux control member may not adhere to the light source, it is possible to implement the embodiment. In this regard, the detailed description will be as follows.

FIG. 9 is a sectional view showing a light emitting device according to the fourth embodiment.

Referring to FIG. 9, the light emitting device 400 according to the fourth embodiment includes a light source 410, a light flux control member 420 and a drive substrate 430. The light flux control member 420 includes a depressed portion 421 and a groove portion 422 formed therein. The light flux control member 420 includes an incident surface 423, a reflective surface 424, a first refractive surface 425, and a back surface 427. Since the elements of the light emitting device according to the fourth embodiment are the same as or similar with the corresponding those of the above-described embodiments, the detailed description will be omitted.

In the light emitting device 400 according to the fourth embodiment, the groove portion 422 of the light flux control member 420 has a size greater than that of the light source 410. The groove portion 422 receives the whole of the light source 410. That is, the light source 410 is disposed in the groove portion 422. A recess portion 428 is further formed in the light flux control member 420. The recess portion 428 is formed at the central portion of the depressed portion 421. The recess portion 428 corresponds to the light source 410. The recess portion 428 is concave toward the light source 410. The center of the recess 428 is disposed on the light axis OA of the light source 410. In other words, recess portion 421 has a line-symmetric structure with respect to the optical axis OA of the light source 410.

In addition, in the light emitting device 400 of the embodiment, the incident surface 423 is disposed in the recess portion 422, and the reflective surface 424 is disposed in the depressed portion 421. The reflective surface 424 includes a first reflective surface 424a and a second reflective surface 424b.

The incident surface 423 is disposed in the recess portion 422. The incident surface 423 is spaced apart from the light source 410. That is, the incident surface 423 does not make contact with the light source 410. The light source 110 is sealed with the incident source 110. That is, the light source 110 is entirely sealed on the drive substrate 130 with the incident surface 423. A space is formed between the incident surface 423 and the light source 410. Thus, the light generated from the light source 410 is incident upon the incident surface 423 through the space. The light generated from the light source 410 may be incident upon the incident surface 423 without loss between the light source 410 and the incident surface 423.

The first reflective surface 424a is disposed in the recess portion 428. The first reflective surface 424a is an inner surface of the recess portion 428. That is, the first reflective surface 424a is extended from the optical axis OA of the light source 110. The first reflective surface 424a is extended in an outer direction inclined at a third angle θ3 to a plane perpendicular to the optical axis OA of the light source 410. In other words, the distance between the first reflective surface 424a and the optical axis OA of the light source 410 is gradually increased from the light source 410. The first reflective surface 424a may have a cone shape having the vertex toward the light source 410.

The second reflective surface 424b is disposed in the depressed portion 421. The second reflective surface 424b is an inner surface of the depressed portion 421. That is, the second reflective surface 424b is extended from the first reflective surface 424a. The second reflective surface 424b is extended in an outer direction inclined at a fourth angle θ4 to the plane perpendicular to the optical axis OA of the light source 410. In other words, the distance between the second reflective surface 424b and the optical axis OA of the light source 410 is gradually increased from the light source 410. The fourth angle θ4 may be less than or more than the third angle θ3. In addition, the second reflective surface 424b is connected to the first refractive surface 425.

Meanwhile, although the light source and the light flux control member, which adhere to each other through the groove portion of the light flux control member, are disclosed in the above described embodiment as one example, the embodiment is not limited thereto. That is, even though the groove portion is not formed in the light flux control member, it is possible to implement the embodiment. In this regard, the detailed description will be as follows.

FIG. 10 is a sectional view showing a light emitting device according to the fifth embodiment.

Referring to FIG. 10, the light emitting device 500 according to the fifth embodiment includes a light source 510, a light flux control member 520 and a drive substrate 530. The light flux control member 520 includes a depressed portion 521 formed therein. The light flux control member 520 includes an incident surface 523, a reflective surface 524, a first refractive surface 525, and a back surface 527. Since the elements of the light emitting device 500 according to the fifth embodiment are the same as or similar with the corresponding those of the above-described embodiments, the detailed description will be omitted.

Only, in the light emitting device 500 according to the embodiment, the drive substrate 530 further includes a receiving recess 534 formed therein. The receiving recess 534 is formed at an upper portion of the drive substrate 530. The receiving recess 534 corresponds to the light source 510. The receiving recess 534 is concave toward a lower portion of the drive substrate 530. The center of the receiving recess 534 is disposed on the optical axis OA of the light source 510. That is, the receiving recess 534 has a line-symmetric structure with respect to the optical axis OA of the light source 510. Thus, the receiving recess 534 receives the light source 510.

According to the light emitting device 500 of the embodiment, a mounting surface 532 includes an inner surface of the receiving recess 534. The mounting surface 532 adheres to the light source 510 in the receiving recess 534. That is, the mounting surface 532 makes direct contact with the light source 510. Further, the mounting surface 532 may adhere to the light flux control member 520 at a periphery of the receiving recess 534. That is, the mounting surface 532 may make direct contact with the back surface of the light flux control member 520.

Further, in the light emitting device 500 according to the embodiment, the incident surface 523 of the light flux control member 520 is spaced apart from the light source 510. That is, the incident surface 523 is disposed corresponding to the receiving recess 534 of the drive substrate 530. The incident surface 523 is exposed from the mounting surface 532 through the receiving recess 534. The incident surface 523 faces the light source 510. The incident surface 523 may be aligned on the same plane with the back surface 527. Thus, the light generated from the light source 510 may be incident upon the incident surface 523.

Meanwhile, although the light flux control member which refracts light at the same beam angle with respect to all directions is disclosed in the above-described embodiment, the embodiment is not limited thereto. That is, even though the light flux control member refracts light at mutually different beam angles with respect to at least two directions, it is possible to implement the embodiment. In this regard, the detailed description will be as follows.

FIG. 11 is an exploded perspective view showing a light emitting device according to the sixth embodiment. FIG. 12 is a sectional view showing the light emitting device according to the sixth embodiment based on a first direction. FIG. 13 is a sectional view showing the light emitting device according to the sixth embodiment based on a second direction.

Referring to FIGS. 11 to 13, the light emitting device 600 according to the sixth embodiment includes a light source 610, a light flux control member 620 and a drive substrate 630. Since the elements of the light emitting device 600 according to the sixth embodiment are similar to those of the above-described embodiment, the detailed description thereof will be omitted.

In the light emitting device 600 according to the sixth embodiment, the light flux control member 620 has an anisotropic structure. That is, the light flux control member 620 has not a line-symmetric structure, but a plane-symmetric structure. The light flux control member 620 is relatively short in a first direction and relatively long in a second direction. The first and second directions are perpendicular to the optical axis OA of the light source 610. In addition, the first direction is perpendicular to the second direction. In other words, a plane shape of the light flux control member 620 may be for example, elliptic. In addition, a plane shape of the depressed portion 621 may be for example, elliptic.

In this case, a first symmetric surface and a second symmetric surface are defined. The first symmetric surface is extended in a first direction from the optical axis OA of the light source 610. The second symmetric surface is extended in a second direction from the optical axis OA of the light source 610. That is, the optical axis OA of the light source 610 is disposed on the first and second symmetric surfaces. In addition, the first and second symmetric surfaces cross each other on the optical axis OA of the light source 610. The area of the second symmetric surface is larger than that of the first symmetric surface.

The light flux control member 620 has a plane-symmetric structure with respective to each of the first and second symmetric surfaces. That is, the light flux control member 620 may be divided into two surfaces, the sizes of which are equal to each other, by the first symmetric surface. In addition, the light flux control member 620 may be divided into two surfaces, the sizes of which are equal to each other, by the second symmetric surface.

Further, in the light emitting device 600 of the embodiment, the reflective portions 633 are formed at a periphery of the light flux control member 620 in the first direction. The reflective portions 633 are extended in the second direction.

According to the embodiment, the light generated from the light source is radiated at mutually different beam angles according to a direction. That is, the light output from the light flux control member 620 has a first beam angle with respect to the first direction and a second beam angle with respect to the second direction. The first beam angle may be greater than the second beam angle. The light output from the light flux control member 620 may be gradually reduced from the first direction to the second direction.

That is, after a first light L1 is generated from the light source 610, the first light L1 is output from the light flux control member 620. The first light L1 has the first beam angle. The first beam angle may be more than 180 degrees (°). Then, the first light L1 is output the light flux control member 620 in a direction inclined at a negative angle with respect to a horizontal plane perpendicular to the optical axis OA of the light source 610. That is, when the first light L1 is output from the light flux member 620, the first angle θ1 between the first light L1 and the horizontal plane is negative. In addition, the first light L1 is reflected on the reflective portion 633.

Meanwhile, after a second light L2 is generated from the light source 610, the second light L2 is output from the light flux control member 620. The second light L2 has the second beam angle. The second beam angle may be equal to or less than 150 degrees (°). Then, the second light L2 is output from the light flux control member 620 in a direction inclined at a positive angle with respect to the horizontal plane perpendicular to the optical axis OA of the light source 610. That is, when the second light L2 is output from the light flux member 620, the second angle θ2 between the second light L2 and the horizontal plane is positive.

FIG. 14 is an exploded perspective view showing a display device according to sixth embodiment. FIG. 15 is sectional view taken along the line B-B' of FIG. 14.

Referring to FIGS. 14 and 55, an LCD (Liquid Crystal Display) 640 according to the embodiment includes a BLU 650 and an LCD panel 660, a panel control substrate 671 and 673, a panel guider 680 and an upper case 690. The BLU 650 includes a lower cover 651, a light emitting device 653 and at least one optical sheet 659. Since the elements of the second embodiment are the same as or similar with the corresponding those of the above-described embodiment, the detailed description will be omitted.

Only, in the LCD 640 according to the embodiment, the light emitting device 653 includes a plurality of drive substrates 654, a plurality of light sources 656 and a plurality of light flux control members 657.

The drive substrates 654 are extended in a second direction. The drive substrates 654 are spaced apart from each other in a first direction and extended in parallel to each other. Each of the drive substrates 654 may have a shape of a bar lengthily extended in the second direction. The number of the drive substrates 654 may be determined according to an area of the LCD panel 660. The area of the LCD panel 660 is defined by a width corresponding to the first direction and a length corresponding to the second direction. The width of each of the drive substrates 654 corresponding to the first direction may be determined according to a width of the LCD panel 660. The width of each of the drive substrates 654 may be in the range of 5 mm to 3 cm. In addition, the length of each of the drive substrates 654 corresponding to the second direction may be determined according to a length of the LCD panel 660.

The drive substrates 654 support the light flux control members 657. The drive substrates 654 control the driving operation of the light sources 656. That is, the drive substrates 654 transfer driving signals to the light sources 656. The drive substrates 654 may be configured as described above according to the embodiment. That is, each of the drive substrates 654 includes first reflective portions 655. The first reflective portions 655 are extended in the second direction. The first reflective portions 655 are spaced apart from each other in the first direction and disposed at both side portions. The first reflective portions 655 reflect the light output from the light flux control members 657.

The light sources 656 are mounted on the drive substrates 654. The light sources 656 are disposed in the second direction on each of the drive substrates 654 in a row. That is, the light sources 656 are mounded in one row on the drive substrates 654. The light sources 656 are disposed between the first reflective portions 655. The light sources are spaced apart from each other by a predetermined distance on each of the drive substrates 654. A first distance D1 between the light sources 656 on each of the drive substrates 654 is narrower than a second distance D2 between the light sources 656 which are mounded on different drive substrates 654. For example, the second distance D2 is 1.3 to 10 times longer than the first distance D1.

The light sources 656 are electrically connected to the drive substrates 654. The light sources 656 are driven to generate light under control of the drive substrates 654.

The light flux control members 657 individually cover the light sources 656. The light flux control members 657 may be configured according to the embodiment as described above. That is, the light flux control members 657 diffuse the light generated from the light sources 656. At this time, the light is less diffused in the second direction than the first direction by the light flux control members 657. The light flux control members 657 may refract the light.

In addition, in the LCD 640 according to the embodiment, the lower cover 651 includes the second reflective portions 652. The second reflective portions 652 are disposed at an outside of the drive substrates 654. The second reflective portions 652 are disposed between the drive substrates 654. The second reflective portions 652 are extended in the second direction. The second reflective portions 652 are spaced apart from each other in the first direction. The second reflective portions 652 reflect the light output from the light flux control members 657.

The second reflective portions 652 may be formed by bending or curving a metal plate when manufacturing the lower cover 651. The second reflective portions 652 may include at least one curve. In other words, the second reflective portions 652 may include a concave curved surface and a convex curved surface. The second reflective portions 652 may be formed by coating a reflection material on the surface of the metal plate. The second reflective portions 652 may be individually manufactured and mounted on the upper portion of the lower cover 651. The second reflective portions 652 may have a sectional shape of triangle, rectangle, diamond or semicircle.

Meanwhile, although the LCD 640 including both of the first reflective portions 655 and second reflective portions 652 is disclosed in the embodiment as one example, the embodiment is not limited thereto. That is, even if the LCD 640 includes at least one of the first and second reflective portions 655 and 652, the embodiment may be implemented. In other words, the LCD 640 may include one of the first and second reflective portions 655 and 652.

According to the embodiments, the reflective portion of the drive substrate reflects the light radiated through the light flux control member, so that the light generated from the light source may be diffused in a wider range. Thus, even though the number of light sources is not increased in the BLU, the light may be effectively radiated toward the LCD panel. In addition, the light flux control member may output light toward the drive substrate, so that the space between the BLU and the LCD panel may be reduced. That is, a thickness of the display device may be reduced. Therefore, brightness uniformity of the display device can be ensured while minimizing the size of the display device.

While the present invention has been described with reference to the particular illustrative embodiments, it is not to be restricted by the embodiments but only by the appended claims. It is to be appreciated that those skilled in the art can change or modify the embodiments without departing from the scope and spirit of the embodiments.

The invention claimed is:
1. A display device comprising:
light sources to generate light;
light flux control members to refract the light;
a drive substrate on which the light sources are mounted;
a cover to cover the drive substrate;
reflective portions disposed in at least one of the drive substrate and the cover to reflect the refracted light; and
a display panel into which the reflected light is incident,
wherein each of the light flux control members comprises
an incident surface into which the light is incident;
a refractive surface to refract the light comprising a first refractive surface and a second refractive surface; and
a back surface extended from the incident surface to the refractive surface,
wherein the second refractive surface is extended from the first refractive surface and is bent or curved, and
wherein the distance between the second refractive surface and the optical axis of the light source is gradually reduced in a direction away from the first refractive surface, and
wherein each of the light flux control members further comprises a reflective surface to reflect the incident light to the refractive surface, the reflective surface being disposed in a depressed portion at an upper portion of each of the light flux control members opposite to the incident surface,
wherein a recessed portion is disposed at a central portion of the depressed portion, the recessed portion being concave toward the light source,
wherein the reflective surface includes a first reflective surface disposed in the recessed portion and a second reflective surface disposed in the depressed portion, wherein the first reflective surface is extended in an outer direction inclined at a first angle relative to a plane perpendicular to the optical axis of the light source, wherein the second reflective surface is extended in an outer direction inclined at a second angle relative to the plane perpendicular to the optical axis of the light source, and wherein the second angle is less than the first angle, and wherein the drive substrate includes a receiving recess, the receiving recess being recessed into the drive substrate toward a lower portion of the drive substrate and the light source is disposed in the receiving recess.

2. The display device of claim 1, wherein the reflective portions are extended in a direction parallel to one axis and in another direction parallel to another axis perpendicular to the one axis, and the reflective portions cross each other.

3. The display device of claim 1, wherein the drive substrate is extended in a direction parallel to one axis, a length of the drive substrate in the direction parallel to the one axis is longer than a width of the drive substrate in a direction parallel to another axis perpendicular to the one axis, and the light sources are mounted in the direction parallel to the one axis in a row.

4. The display device of claim 3, wherein the reflective portions are extended in the direction parallel to the one axis.

5. The display device of claim 1, wherein the reflective portions have a sectional shape of triangle, rectangle, diamond or semicircle.

6. The display device of claim 1, wherein the incident surface adheres to the light sources or is spaced apart from the light sources.

7. The light emitting device of claim 1, wherein the incident surface of the light flux control member is spaced apart from the light source.

8. A light emitting device comprising:
light sources to generate light;
light flux control members to refract the light;
a drive substrate on which the light sources are mounted; and
reflective portions on the drive substrate,
wherein each of the light flux control members comprises
an incident surface into which the light is incident;
a refractive surface to refract the light comprising a first refractive surface and a second refractive surface; and
a back surface extended from the incident surface to the refractive surface,
wherein the second refractive surface is extended from the first refractive surface and is bent or curved, and wherein the distance between the second refractive surface and the optical axis of the light source is gradually reduced in a direction away from the first refractive surface, and wherein each of the light flux control members further comprises a reflective surface to reflect the incident light to the refractive surface, the reflective surface being disposed in a depressed portion at an upper portion of each of the light flux control members opposite to the incident surface, wherein a recessed portion is disposed at a central portion of the depressed portion, the recessed portion being concave toward the light source, wherein the reflective surface includes a first reflective surface disposed in the recessed portion and a second reflective surface disposed in the depressed portion, wherein the first reflective surface is extended in an outer direction inclined at a first angle relative to a plane perpendicular to the optical axis of the light source, wherein the second reflective surface is extended in an outer direction inclined at a second angle relative to the plane perpendicular to the optical axis of the light source, and wherein the second angle is less than the first angle, and wherein the drive substrate includes a receiving recess, the receiving recess being recessed into the driving substrate toward a lower portion of the drive substrate and the light source is disposed in the receiving recess.

9. The light emitting device of claim 8, wherein the reflective portions are extended in a direction parallel to one axis and in another direction parallel to another axis perpendicular to the one axis, and the reflective portions cross each other.

10. The light emitting device of claim 8, wherein the drive substrate is extended in a direction parallel to one axis, a length of the drive substrate in the direction parallel to the one axis is longer than a width of the drive substrate in a direction parallel to another axis perpendicular to the one axis, and the light sources are mounted in the direction parallel to the one axis in a row.

11. The light emitting device of claim 10, wherein the reflective portions are extended in the direction parallel to the one axis.

12. The light emitting device of claim 8, wherein the reflective portions has a sectional shape of triangle, rectangle, diamond or semicircle.

13. The light emitting device of claim 7, wherein the incident surface is aligned to be on a same plane with the back surface.

* * * * *